US010776091B1

(12) United States Patent
Wagner et al.

(10) Patent No.: US 10,776,091 B1
(45) Date of Patent: Sep. 15, 2020

(54) LOGGING ENDPOINT IN AN ON-DEMAND CODE EXECUTION SYSTEM

(71) Applicant: Amazon Technologies, Inc., Seattle, WA (US)

(72) Inventors: Timothy Allen Wagner, Seattle, WA (US); Marc John Brooker, Seattle, WA (US); Bryan Nicholas Moffatt, Seattle, WA (US); Robison Rodrigues dos Santos, Seattle, WA (US); Niranjan Jayakar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/905,342

(22) Filed: Feb. 26, 2018

(51) Int. Cl.
*G06F 9/44* (2018.01)
*G06F 8/41* (2018.01)

(52) U.S. Cl.
CPC ............ *G06F 8/4441* (2013.01); *G06F 8/447* (2013.01)

(58) Field of Classification Search
CPC .... G06F 9/45533; G06F 9/50; G06F 11/3636; G06F 2009/4557
See application file for complete search history.

(56) References Cited

U.S. PATENT DOCUMENTS

| | | | |
|---|---|---|---|
| 4,949,254 A | 8/1990 | Shorter | |
| 5,283,888 A | 2/1994 | Dao et al. | |
| 5,970,488 A | 10/1999 | Crowe et al. | |
| 6,385,636 B1 | 5/2002 | Suzuki | |
| 6,463,509 B1 | 10/2002 | Teoman et al. | |
| 6,501,736 B1 | 12/2002 | Smolik et al. | |

(Continued)

FOREIGN PATENT DOCUMENTS

| | | |
|---|---|---|
| EP | 2663052 A1 | 11/2013 |
| JP | 2002287974 A | 10/2002 |

(Continued)

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].

(Continued)

*Primary Examiner* — Duy Khuong T Nguyen
(74) *Attorney, Agent, or Firm* — Knobbe, Martens, Olson & Bear, LLP

(57) ABSTRACT

Systems and methods are described for providing logging functionalities to code executing in an on-demand code execution system while minimizing the need to define such functionalities within the code. A logging endpoint is provided that can be called by an execution of code and passed information for logging. The logging endpoint can enrich the information with additional information, such as information regarding a state of an execution environment for the code (which additional information may not be accessible to the execution of code itself). The logging endpoint can then facilitate storage of the enriched logging information, such as by handling authentication to a storage endpoint. Thus, users of the system may author code that provides robust logging functionalities while minimizing the implementation of such functionalities within the authored code.

20 Claims, 6 Drawing Sheets

(56) References Cited

U.S. PATENT DOCUMENTS

| | | |
|---|---|---|
| 6,523,035 B1 | 2/2003 | Fleming et al. |
| 6,708,276 B1 | 3/2004 | Yarsa et al. |
| 7,036,121 B1 | 4/2006 | Casabona et al. |
| 7,590,806 B2 | 9/2009 | Harris et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,831,464 B1 * | 11/2010 | Nichols ............... G06F 11/3409 705/7.39 |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,429,282 B1 | 4/2013 | Ahuja |
| 8,448,165 B1 | 5/2013 | Conover |
| 8,490,088 B2 | 7/2013 | Tang |
| 8,555,281 B1 | 10/2013 | Van Dijk et al. |
| 8,566,835 B2 | 10/2013 | Wang et al. |
| 8,601,323 B2 * | 12/2013 | Tsantilis ............... G06F 11/366 714/42 |
| 8,613,070 B1 | 12/2013 | Borzycki et al. |
| 8,631,130 B2 | 1/2014 | Jackson |
| 8,677,359 B1 | 3/2014 | Cavage et al. |
| 8,694,996 B2 | 4/2014 | Cawlfield et al. |
| 8,700,768 B2 | 4/2014 | Benari |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,799,236 B1 | 8/2014 | Azari et al. |
| 8,799,879 B2 | 8/2014 | Wright et al. |
| 8,806,468 B2 | 8/2014 | Meijer et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,874,952 B2 | 10/2014 | Tameshige et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,141,410 B2 | 9/2015 | Leafe et al. |
| 9,146,764 B1 | 9/2015 | Wagner |
| 9,152,406 B2 | 10/2015 | De et al. |
| 9,164,754 B1 | 10/2015 | Pohlack |
| 9,183,019 B2 | 11/2015 | Kruglick |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 * | 11/2016 | Lietz ............... G06F 11/0784 |
| 9,514,037 B1 | 12/2016 | Dow et al. |
| 9,537,788 B2 | 1/2017 | Reque et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,767,271 B2 | 9/2017 | Ghose |
| 9,785,476 B2 | 10/2017 | Wagner et al. |
| 9,787,779 B2 | 10/2017 | Frank et al. |
| 9,811,363 B1 | 11/2017 | Wagner |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,162,672 B2 | 12/2018 | Wagner et al. |
| 10,162,688 B2 | 12/2018 | Wagner |
| 10,203,990 B2 | 2/2019 | Wagner et al. |
| 10,248,467 B2 | 4/2019 | Wisniewski et al. |
| 10,277,708 B2 | 4/2019 | Wagner et al. |
| 10,303,492 B1 | 5/2019 | Wagner et al. |
| 10,353,678 B1 | 7/2019 | Wagner |
| 10,353,746 B2 | 7/2019 | Reque et al. |
| 10,365,985 B2 | 7/2019 | Wagner |
| 10,387,177 B2 | 8/2019 | Wagner et al. |
| 10,402,231 B2 | 9/2019 | Marriner et al. |
| 10,437,629 B2 | 10/2019 | Wagner et al. |
| 10,445,140 B1 | 10/2019 | Sagar et al. |
| 10,528,390 B2 | 1/2020 | Brooker et al. |
| 10,552,193 B2 | 2/2020 | Wagner et al. |

(56) References Cited

U.S. PATENT DOCUMENTS

| | | |
|---|---|---|
| 10,564,946 B1 | 2/2020 | Wagner et al. |
| 10,572,375 B1 | 2/2020 | Wagner |
| 10,592,269 B2 | 3/2020 | Wagner et al. |
| 2001/0044817 A1 | 11/2001 | Asano et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0229794 A1 | 12/2003 | James, II et al. |
| 2004/0003087 A1 | 1/2004 | Chambliss et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1* | 7/2005 | Frey ............... G06F 11/3636 |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2006/0123066 A1 | 6/2006 | Jacobs et al. |
| 2006/0129684 A1 | 6/2006 | Datta |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0174419 A1 | 7/2007 | O'Connell et al. |
| 2007/0192082 A1 | 8/2007 | Gaos et al. |
| 2007/0199000 A1 | 8/2007 | Shekhel et al. |
| 2007/0220009 A1 | 9/2007 | Morris et al. |
| 2007/0240160 A1 | 10/2007 | Paterson-Jones |
| 2007/0255604 A1 | 11/2007 | Seelig |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2009/0006897 A1 | 1/2009 | Sarsfield |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0177860 A1 | 7/2009 | Zhu et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1* | 10/2009 | Scheifler ............... G06F 9/485<br>709/202 |
| 2009/0288084 A1 | 11/2009 | Astete et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2010/0312871 A1 | 12/2010 | Desantis et al. |
| 2010/0325727 A1 | 12/2010 | Neystadt et al. |
| 2010/0329149 A1* | 12/2010 | Singh ............... H04L 12/4625<br>370/254 |
| 2011/0010722 A1 | 1/2011 | Matsuyama |
| 2011/0029970 A1 | 2/2011 | Arasaratnam |
| 2011/0040812 A1 | 2/2011 | Phillips |
| 2011/0055378 A1 | 3/2011 | Ferris et al. |
| 2011/0055396 A1 | 3/2011 | DHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0314465 A1 | 12/2011 | Smith et al. |
| 2011/0321033 A1 | 12/2011 | Kelkar et al. |
| 2012/0011496 A1 | 1/2012 | Shimamura |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0222038 A1 | 8/2012 | Katragadda et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |

(56) References Cited

U.S. PATENT DOCUMENTS

| | | |
|---|---|---|
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0152047 A1 | 6/2013 | Moorthi et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | Mcgrath |
| 2013/0227641 A1 | 8/2013 | White et al. |
| 2013/0227710 A1 | 8/2013 | Barak et al. |
| 2013/0232480 A1 | 9/2013 | Winterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283176 A1 | 10/2013 | Hoole et al. |
| 2013/0290538 A1 | 10/2013 | Gmach et al. |
| 2013/0291087 A1* | 10/2013 | Kailash ............... H04L 63/1425 726/11 |
| 2013/0297964 A1 | 11/2013 | Hegdal et al. |
| 2013/0311650 A1 | 11/2013 | Brandwine et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068611 A1 | 3/2014 | McGrath et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault et al. |
| 2014/0215073 A1 | 7/2014 | Dow et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282418 A1* | 9/2014 | Wood ............... G06F 11/323 717/125 |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0344457 A1 | 11/2014 | Bruno, Jr. et al. |
| 2014/0344736 A1 | 11/2014 | Ryman et al. |
| 2014/0380085 A1 | 12/2014 | Rash et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0052258 A1 | 2/2015 | Johnson et al. |
| 2015/0058914 A1 | 2/2015 | Yadav |
| 2015/0067830 A1 | 3/2015 | Johansson et al. |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0134626 A1 | 5/2015 | Theimer et al. |
| 2015/0135287 A1 | 5/2015 | Medeiros et al. |
| 2015/0142952 A1 | 5/2015 | Bragstad et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0227598 A1* | 8/2015 | Hahn ............... G06F 16/122 707/722 |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0370560 A1 | 12/2015 | Tan et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0012099 A1 | 1/2016 | Tuatini et al. |
| 2016/0019536 A1 | 1/2016 | Ortiz et al. |
| 2016/0026486 A1 | 1/2016 | Abdallah |
| 2016/0048606 A1 | 2/2016 | Rubinstein et al. |
| 2016/0070714 A1* | 3/2016 | D'Sa ............... G06F 11/1471 707/692 |
| 2016/0072727 A1 | 3/2016 | Leafe et al. |
| 2016/0077901 A1 | 3/2016 | Roth et al. |
| 2016/0098285 A1 | 4/2016 | Davis et al. |
| 2016/0100036 A1 | 4/2016 | Lo et al. |
| 2016/0117254 A1 | 4/2016 | Susarla et al. |
| 2016/0124665 A1 | 5/2016 | Jain et al. |
| 2016/0140180 A1 | 5/2016 | Park et al. |
| 2016/0191420 A1 | 6/2016 | Nagarajan et al. |
| 2016/0285906 A1 | 9/2016 | Fine et al. |
| 2016/0292016 A1 | 10/2016 | Bussard et al. |
| 2016/0294614 A1 | 10/2016 | Searle et al. |

(56) References Cited

U.S. PATENT DOCUMENTS

| | | | |
|---|---|---|---|
| 2016/0301739 A1 | 10/2016 | Thompson |
| 2016/0306613 A1 | 10/2016 | Busi et al. |
| 2016/0350099 A1 | 12/2016 | Suparna et al. |
| 2016/0357536 A1 | 12/2016 | Firlik et al. |
| 2016/0364265 A1 | 12/2016 | Cao et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378554 A1 | 12/2016 | Gummaraju et al. |
| 2017/0041309 A1 | 2/2017 | Ekambaram et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085591 A1 | 3/2017 | Ganda et al. |
| 2017/0090961 A1 | 3/2017 | Wagner et al. |
| 2017/0093684 A1 | 3/2017 | Jayaraman et al. |
| 2017/0093920 A1 | 3/2017 | Ducatel et al. |
| 2017/0116051 A1 | 4/2017 | Wagner et al. |
| 2017/0177391 A1 | 6/2017 | Wagner et al. |
| 2017/0177413 A1 | 6/2017 | Wisniewski et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0230499 A1 | 8/2017 | Mumick et al. |
| 2017/0272462 A1 | 9/2017 | Kraemer et al. |
| 2017/0286143 A1 | 10/2017 | Wagner et al. |
| 2017/0286156 A1 | 10/2017 | Wagner et al. |
| 2017/0371703 A1 | 12/2017 | Wagner et al. |
| 2017/0371706 A1 | 12/2017 | Wagner et al. |
| 2017/0371724 A1 | 12/2017 | Wagner et al. |
| 2018/0004553 A1 | 1/2018 | Wagner et al. |
| 2018/0004572 A1 | 1/2018 | Wagner et al. |
| 2018/0039506 A1 | 2/2018 | Wagner et al. |
| 2018/0046453 A1 | 2/2018 | Nair et al. |
| 2018/0046482 A1 | 2/2018 | Karve et al. |
| 2018/0060221 A1 | 3/2018 | Yim et al. |
| 2018/0067841 A1 | 3/2018 | Mahimkar |
| 2018/0121245 A1 | 5/2018 | Wagner et al. |
| 2018/0143865 A1 | 5/2018 | Wagner et al. |
| 2018/0203717 A1 | 7/2018 | Wagner et al. |
| 2018/0275987 A1 | 9/2018 | Vandeputte |
| 2018/0309819 A1 | 10/2018 | Thompson |
| 2019/0072529 A1 | 3/2019 | Andrawes et al. |
| 2019/0073234 A1 | 3/2019 | Wagner et al. |
| 2019/0102231 A1 | 4/2019 | Wagner |
| 2019/0108058 A1 | 4/2019 | Wagner et al. |
| 2019/0155629 A1 | 5/2019 | Wagner et al. |
| 2019/0171470 A1 | 6/2019 | Wagner |
| 2019/0196884 A1 | 6/2019 | Wagner |
| 2019/0205171 A1 | 7/2019 | Brooker et al. |
| 2019/0227849 A1 | 7/2019 | Wisniewski et al. |
| 2019/0384647 A1 | 12/2019 | Reque et al. |
| 2019/0391834 A1 | 12/2019 | Mullen et al. |
| 2019/0391841 A1 | 12/2019 | Mullen et al. |
| 2020/0057680 A1 | 2/2020 | Marriner et al. |
| 2020/0104198 A1 | 4/2020 | Hussels et al. |
| 2020/0104378 A1 | 4/2020 | Wagner et al. |

FOREIGN PATENT DOCUMENTS

| | | | |
|---|---|---|---|
| JP | 2006-107599 A | 4/2006 |
| JP | 2007-538323 A | 12/2007 |
| JP | 2010-026562 A | 2/2010 |
| JP | 2011-233146 A | 11/2011 |
| JP | 2011257847 A | 12/2011 |
| JP | 2013-156996 A | 8/2013 |
| JP | 2014-525624 A | 9/2014 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2020/005764 A1 | 1/2020 |
| WO | WO 2020/069104 A1 | 4/2020 |

OTHER PUBLICATIONS

Adapter Pattern, Wikipedia, https://en.wikipedia.org/w/index.php?title=Adapter_pattern&oldid=654971255, [retrieved May 26, 2016], 6 pages.

Amazon, "AWS Lambda: Developer Guide", Retrieved from the Internet, Jun. 26, 2016, URL: http://docs.aws.amazon.com/lambda/latest/dg/lambda-dg.pdf.

Balazinska et al., Moirae: History-Enhanced Monitoring, Published: 2007, 12 pages.

Ben-Yehuda et al., "Deconstructing Amazon EC2 Spot Instance Pricing", ACM Transactions on Economics and Computation 1.3, 2013, 15 pages.

Czajkowski, G., and L. Daynes, Multitasking Without Compromise: A Virtual Machine Evolution 47(4a):60-73, ACM SIGPLAN Notices—Supplemental Issue, Apr. 2012.

Das et al., Adaptive Stream Processing using Dynamic Batch Sizing, Nov. 2014, 13 pages.

Dombrowski, M., et al., Dynamic Monitor Allocation in the Java Virtual Machine, JTRES '13, Oct. 9-11, 2013, pp. 30-37.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Hoffman, Auto scaling your website with Amazon Web Services (AWS)—Part 2, Cardinalpath, Sep. 2015, 15 pages.

Nakajima, J., et al., Optimizing Virtual Machines Using Hybrid Virtualization, SAC '11, Mar. 21-25, 2011, TaiChung, Taiwan, pp. 573-578.

Qian, H., and D. Medhi, et al., Estimating Optimal Cost of Allocating Virtualized Resources With Dynamic Demand, ITC 2011, Sep. 2011, pp. 320-321.

Shim (computing), Wikipedia, https://en.wikipedia.org/w/index.php?title+Shim_(computing)&oldid+654971528, [retrieved on May 26, 2016], 2 pages.

Vaghani, S.B., Virtual Machine File System, ACM SIGOPS Operating Systems Review 44(4):57-70, Dec. 2010.

Vaquero, L., et al., Dynamically Scaling Applications in the cloud, ACM SIGCOMM Computer Communication Review 41(1):45-52, Jan. 2011.

Yue et al., AC 2012-4107: Using Amazon EC2 in Computer and Network Security Lab Exercises: Design, Results, and Analysis, 2012, American Society for Engineering Education 2012.

Zheng, C., and D. Thain, Integrating Containers into Workflows: A Case Study Using Makeflow, Work Queue, and Docker, VTDC '15, Jun. 15, 2015, Portland, Oregon, pp. 31-38.

International Search Report and Written Opinion in PCT/US2015/052810 dated Dec. 17, 2015.

International Preliminary Report on Patentability in PCT/US2015/052810 dated Apr. 4, 2017.

International Search Report and Written Opinion in PCT/US2015/052838 dated Dec. 18, 2015.

International Preliminary Report on Patentability in PCT/US2015/052838 dated Apr. 4, 2017.

(56) References Cited

OTHER PUBLICATIONS

International Search Report and Written Opinion in PCT/US2015/052833 dated Jan. 13, 2016.
International Preliminary Report on Patentability in PCT/US2015/052833 dated Apr. 4, 2017.
International Search Report and Written Opinion in PCT/US2015/064071dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Search Report and Written Opinion in PCT/US2016/066997 dated Mar. 20, 2017.
International Search Report and Written Opinion in PCT/US/2017/023564 dated Jun. 6, 2017.
International Search Report and Written Opinion in PCT/US2017/040054 dated Sep. 21, 2017.
International Search Report and Written Opinion in PCT/US2017/039514 dated Oct. 10, 2017.
Amazon, "AWS Lambda: Developer Guide", Retrieved from the Internet, 2019, URL : http://docs.aws.amazon.com/lambda/ latest/dg/lambda-dg.pdf, 521 pages.
Bhadani et al., Performance evaluation of web servers using central load balancing policy over virtual machines on cloud, Jan. 2010, 4 pages.
CodeChef Admin discussion web page, retrieved from https://discuss.codechef.com/t/what-are-the-memory-limit-and-stack-size-on-codechef/14159, 2019. CodeChef IDE web page, Code, Compile & Run, retrieved from https://www.codechef.com/ide, 2019.
Deis, Container, 2014, 1 page.
Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.
Han et al., Lightweight Resource Scaling for Cloud Applications, 2012, 8 pages.
http://discuss.codechef.com discussion web page from date Nov. 11, 2012, retrieved using the WayBackMachine, from https://web.archive.org/web/20121111040051 /http://discuss.codechef.com/questions/2881 /why-are-simple-java-programs-using-up-so-much-space, 2012.
https://www.codechef.com code error help page from Jan. 2014, retrieved from https://www.codechef.com/JAN14/status/ERROR,va123, 2014.
http://www.codechef.com/ide web page from date Apr. 5, 2015, retrieved using the WayBackMachine, from https://web.archive.org/web/20150405045518/http://www.codechef.com/ide, 2015.
Kamga et al., Extended scheduler for efficient frequency scaling in virtualized systems, Jul. 2012, 8 pages.
Kato, et al. "Web Service Conversion Architecture of the Web Application and Evaluation"; Research Report from Information Processing Society, Apr. 3, 2006 with Machine Translation.
Kazempour et al., AASH: an asymmetry-aware scheduler for hypervisors, Jul. 2010, 12 pages.
Kraft et al., 10 performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, 2013, <hal-01228236, pp. 81-89.
Sakamoto, et al. "Platform for Web Services using Proxy Server"; Research Report from Information Processing Society, Mar. 22, 2002, vol. 2002, No. 31.
Stack Overflow, Creating a database connection pool, 2009, 4 pages.
Tan et al., Provisioning for large scale cloud computing services, Jun. 2012, 2 pages.
Wang et al., "Improving utilization through dynamic VM resource allocation in hybrid cloud environment", Parallel and Distributed V Systems (ICPADS), IEEE, 2014. Retrieved on Feb. 14, 2019, Retrieved from the internet: URL<https://ieeexplore.ieee.org/stamp/stamp.jsp?tp=&arnumber=7097814, 8 pages.
Wikipedia List_of_HTTP status_codes web page, retrieved from https://en.wikipedia.org/wiki/List_of_HTTP status_codes, 2019.
Wikipedia Recursion web page from date Mar. 26, 2015, retrieved using the WayBackMachine, from https://web.archive.org/web/20150326230100/https://en.wikipedia.org/wiki/Recursion_(computer_science), 2015.
Wikipedia subroutine web page, retrieved from https://en.wikipedia.org/wiki/Subroutine, 2019.
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Extended Search Report in European Application No. 15846932.0 dated May 3, 2018.
Extended Search Report in European Application No. 15847202.7 dated Sep. 9, 2018.
Extended Search Report in European Application No. 15846542.7 dated Aug. 27, 2018.
International Preliminary Report on Patentability in PCT/US2016/054774 dated Apr. 3, 2018.
International Preliminary Report on Patentability in PCT/US2016/066997 dated Jun. 26, 2018.
International Preliminary Report on Patentability in PCT/US/2017/023564 dated Oct. 2, 2018.
International Preliminary Report on Patentability in PCT/US2017/040054 dated Jan. 1, 2019.
International Preliminary Report on Patentability in PCT/US2017/039514 dated Jan. 1, 2019.
CodeChef IDE web page, Code, Compile & Run, retrieved from https://www.codechef.com/ide, 2019.
Wikipedia "API" pages from date Apr. 7, 2015, retrieved using the WayBackMachine from https://web.archive.org/web/20150407191158/https://en.wikipedia.org/wiki/Application_programming_interface.
Extended European Search Report in application No. 17776325.7 dated Oct. 23, 2019.
Office Action in European Application No. 17743108.7 dated Jan. 14, 2020.

* cited by examiner

US 10,776,091 B1

LOGGING ENDPOINT IN AN ON-DEMAND CODE EXECUTION SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
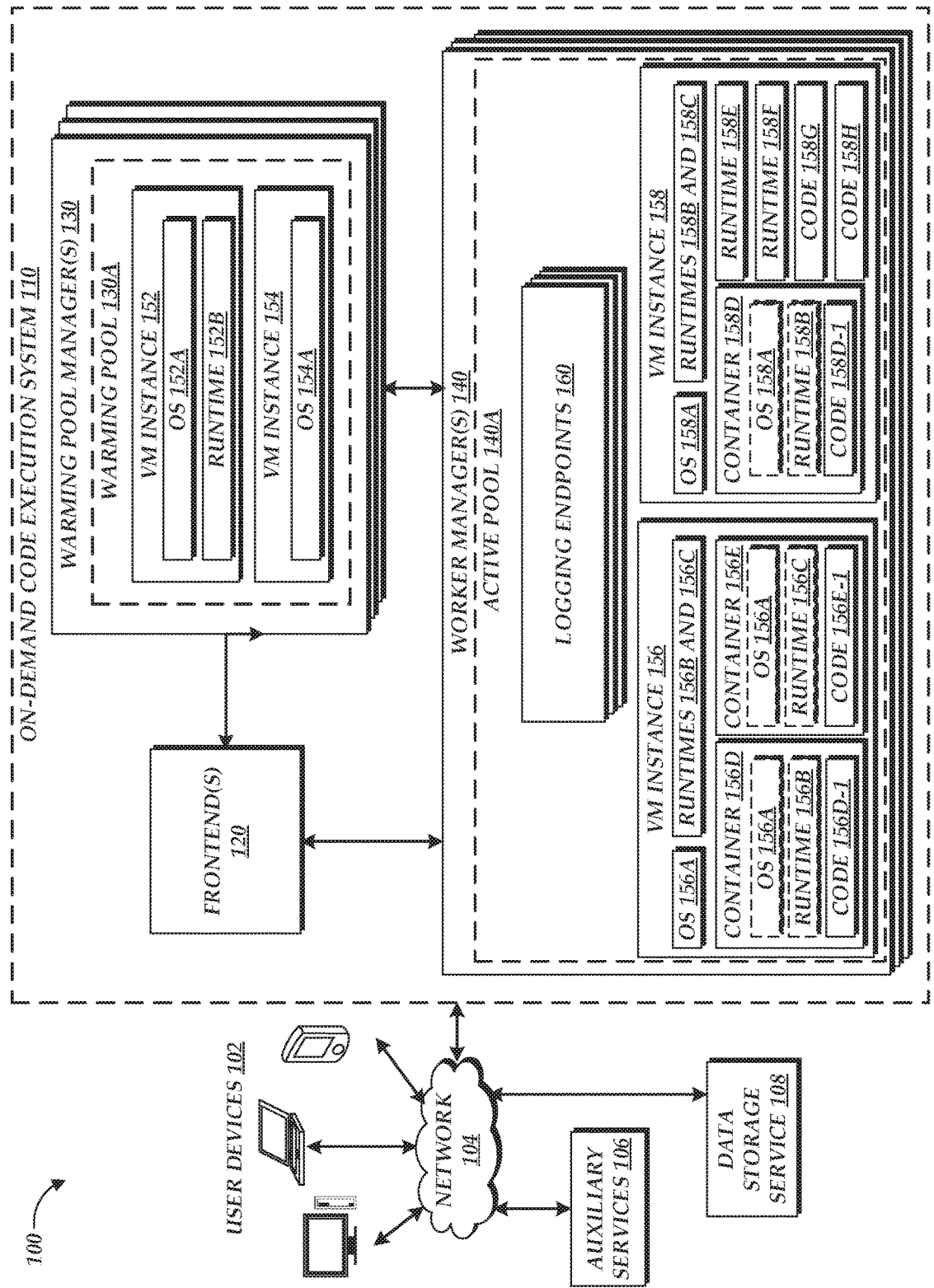
FIG. 1 is a block diagram depicting an illustrative environment in which an on-demand code execution system can operate to execute tasks corresponding to code, which may be submitted by users of the on-demand code execution system, within an environment provisioned with a runtime, which may also be submitted by users of the on-demand code execution system, and to submit error or log data to a logging endpoint provided by the on-demand code execution system.

Generally described, aspects of the present disclosure relate to an on-demand code execution system. The on-demand code execution system enables rapid execution of code, which may be supplied by users of the on-demand code execution system. Moreover, in accordance with embodiments of the present disclosure, the on-demand code execution system can facilitate logging of information regarding code executing on the on-demand code execution system, in a manner that is uniform across multiple coding languages, provides in-depth data regarding the execution of the code (including potentially data unavailable to the execution itself), and has little or no impact on resources used during the execution of the code. In one embodiment, the on-demand code execution system can provide a logging endpoint to an execution of code, which may be communicated with via a commonly-used protocol, such as the hypertext transport protocol (HTTP). Thus, the logging endpoint may be utilized by code written in any language that supports communication via the commonly-used protocol. The logging endpoint may enable the code to asynchronously (e.g., with respect to the code execution) write data to a storage location, such as network-attached storage, without requiring the code to implement functionalities such as communications or authentication with the storage location. In some instances, the logging endpoint can further enrich log data received from a code execution, potentially with information not available to the code execution. This data may include, for example, a triggering cause of the code execution (such as an identifier of a request to execute the code), state information regarding an execution environment of the code execution (e.g., a type of environment, resource usage, etc.), or state information of other code executions executing within the environment. Thus, the logging endpoint can provide a uniform, easily used mechanism for logging information generated by a variety of different code executions on an on-demand code execution system, and can provide data regarding operation of the on-demand code execution system during execution of code without requiring (or exposing to) the code to have knowledge as to the operation of the on-demand code execution system itself.

As described in detail herein, the on-demand code execution system may provide a network-accessible service enabling users to submit or designate computer-executable code (e.g., source code) to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system (which may include, for example, compiling or interpreting the code) may be referred to as an "execution"

of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

One approach to enabling execution of tasks within an on-demand code execution system is to require the tasks to be executable within a defined runtime environment, such as an environment supporting execution of code in a specific programming language (e.g., the PYTHON™ language). Because many programming languages support cross-language calls (e.g., via execution of subprocesses, execution of system-level shell commands, or the like), such tasks might not be limited to code written in that specific programming language. However, under such an approach, tasks may be required to ultimately be rooted in code executable by the specific programming language, even when such code is used only to "bootstrap" code of a different language. This approach may simplify operation of the on-demand code execution system, since a variety of environments can be maintained including a runtime for the specified programming language, and each task may execute in any such runtime. However, this approach may also create inefficiencies within the on-demand code execution system, since use of a first language to bootstrap execution of code of a different language may be inefficient, as compared to executing the code of the different language directly within a runtime supporting that different language. Moreover, this approach may also present difficulties to end users, since each task might be required to be created with the specific programming language in mind. For example, an end user creating a task may be required to create or implement a bootstrapper from the specific programming language implemented natively on the on-demand code execution system to their desired programming language.

To address this, it may be desirable for the on-demand code execution system to "natively" support multiple programming languages, such that code of the languages may be executed directly within an execution environment (e.g., without use of a bootstrapper of another language). While it may be possible for the on-demand code execution system to be manually configured to support multiple languages, such manual configuration may require significant effort on the part of an administrator of the on-demand code execution system to provide support for each language. For example, each language may be required to implement various functionalities of the on-demand code execution system, such as reception of requests to execute tasks, queueing of those requests, reporting of results of execution, logging, and the like. Given the wide variety of languages available, and the rapid rate of introduction of new languages, it is therefore desirable to enable support of new runtimes (such as those supporting new languages), through a standardized interface that requires little or no knowledge or support, within the runtime, for how various functionalities of the on-demand code execution system are implemented. Illustratively, the use of such a standardized interface may enable user-submission of new runtimes to the on-demand code execution system.

Support for multiple different runtimes at the on-demand code execution system may create technical challenges on the on-demand code execution system. For example, as noted above, where the on-demand code execution system supports only a single native runtime (e.g., supporting a specific programming language), the on-demand code execution system may be configured to maintain a pool of environments supporting that runtime, such that tasks can be rapidly executed within the runtime. Because only a single native runtime is required, all environments can be provisioned with the runtime, and the on-demand code execution system may be required only to ensure that a sufficient number of environments exist at any given time to execute tasks. Introduction of new runtimes complicates this process, as in addition to ensuring that a sufficient number of environments exist to fulfill requests, the on-demand code execution system may be required to ensure that those environments are provisioned with a correct runtime for the requests. While it may be possible to independently manage a pool of environments for each runtime (e.g., by creating and destroying environments for each runtime according to need for that runtime), such action may increase the complexity of operation of the on-demand code execution system, while also reducing its efficiency. For example, the on-demand code execution system may implement environments within a hosted computing environment (or "cloud" environment) that provides an interface through which new environments may be dynamically created or destroyed. If the on-demand code execution system maintains a pool of environments for each runtime, each pool may be required to separately interact with this interface, increasing the number of calls to the interface and the complexity of managing the on-demand code execution system. Moreover, if in this scenario the need for two different pools of environments shifts in opposite directions (e.g., a need for environments of one runtime increasing while a need for environments of another runtime decreasing), excessive calls to the interface may be generated (e.g., near simultaneous calls to both create and destroy environments) leading to a reduction in operating efficiency of the system.

Thus, the on-demand code execution system is configured to maintain a single pool of available environments (e.g., created or destroyed according to a volume of requests to execute tasks generally), and to provision those environments with various runtimes according to a demand for each runtime. Thus, the management of a number of environments may be divided from the management of which runtimes are provisioned on those environments, simplifying operation of the on-demand code execution system and reducing unnecessary calls to a hosted computing environment. More specifically, and as described in detail below, the proportion of available environments provisioned with various runtimes may be determined according to a depth of a logical queue associated with each runtime, and without requiring any individual runtime to itself implement functionality for monitoring a workload associated with the runtime. While illustrative examples are provided herein with reference to a queue for a given runtime, in some embodiments, the on-demand code execution system may maintain multiple queues for a given runtime. For example, a queue may be maintained for each unique combination of runtime and task that depends on the runtime. Thus, references to a queue for a given runtime may be understood to encompass one or more queues for the runtime, each of which may be associated with the runtime and one or more additional criteria (e.g., a specific task, a specific user, a group of tasks or users, etc.).

A further difficulty in implementing different runtimes within an on-demand code execution system can stem from logging of information provided by such runtimes. As would be appreciated by on skilled in the art, different runtimes (e.g., associated with execution of code written in different programming languages) can implement logging, such as error reporting, in different ways. Thus, the on-demand code execution system might be required to support a logging mechanism provided by each different runtime. This might unduly restrict support for runtimes on the on-demand code execution system. Moreover, accurate interpretation of logging information (such as diagnosis of an error) may be assisted by or require information not made available to a runtime or code executing in that runtime by the on-demand code execution system. For example, in some embodiments the on-demand code execution system may execute code within isolated execution environments, such as software-based execution containers or virtual machine instances. These environments (or other factors) may restrict a code execution from accessing information external to the environment, such as a network location of a host in which the environment is hosted, computing resource usage of the host, a number of other environments hosted by the host, and the like. However, this data may be helpful in diagnosing issues with the code execution, such as a slow execution speed. To address these problems, the on-demand code execution system may make a logging endpoint available to a code execution, and enable the code execution to transmit data (such as error data) to the logging endpoint. The logging endpoint may further enrich the data with additional information, such as the external information noted above, before storing the data at a defined location (such as network-accessible storage). Thus, the external data may be made available within the stored data without requiring a runtime or code to retrieve the external data, and without exposing access to the data (and potentially other private information) to the runtime or code. As will be discussed below, the logging endpoint may further provide enrich logging data with additional data that may or may not be available to a runtime or code execution, but which might require additional complexity within the runtime or code to retrieve. For example, the logging endpoint may enrich log data with additional information such as specific identifier of a request that caused a code execution, reducing the need for a runtime or code execution to handle retrieval and inclusion of such information with the log data generated by a code execution.

In some embodiments, the logging endpoint may be implemented in an environment nearby to (e.g., in terms of physical or network distance) or co-hosted with an execution environment for a code execution. Such a proximate location may facilitate access of the logging endpoint to enrichment data, such as data regarding a state of a host of the execution environment. In some instances, such a proximate location may also increase the accuracy of enrichment data. For example, where log data from a code execution is enriched with timestamp values, proximate location of a logging endpoint may enable the logging endpoint to use a local receipt time of log data as the timestamp value, without transmission time of the log data creating large inaccuracies in the timestamp. As another example, proximate location of a logging endpoint may enable the logging endpoint to use current resource usage of a host as enrichment data for a given set of logging data, because a short distance between the code execution and logging endpoint increases a likelihood that current resource usage information is reflective of resource usage information at a time when log data is generated at a code execution. Because the on-demand code execution system might include multiple hosts for execution environments, in one embodiment, each host implements a distinct logging endpoint made available to code executing on the host. In some such embodiments, each logging endpoints may be associated with a common identifier, such as a common uniform resource identifier (URI), and each host may implement a domain name system (DNS) server that resolves the URI into an address (e.g., an internet protocol, or "IP," address) of the logging endpoint implemented on the host. Thus, code may reference the URI to transmit code to a proximate logging endpoint, regardless of which host hosts an execution environment for an execution of the code.

In some embodiments, the logging endpoint provide additional or alternative functionalities to simply development of code on the on-demand code execution system. For example, in one embodiment, the logging endpoint assists with authentication to a network-based storage service in order to store enriched log data. Illustratively, a user associated with a runtime or code on the on-demand code execution system may specify authentication information for log data, such as a user name and password or an authentication token. Rather than requiring code of a task to handle such authentication information, the logging endpoint may retrieve the authentication information and provide it to the storage service prior to storing enriched log data on the service. Thus, the code required to implement logging within a task may be minimal. In some instances, a runtime may be configured to facilitate transmission of data to the logging endpoint through a standard function call, such as "stdout" or "stderror" functions. Illustratively, calling of the function within task code may cause, within the code execution, transmission of data passed to the function to the logging endpoint, which may enrich the data and facilitate storage of the data at a storage service (including, for example, authenticating with the storage service). Thus, by virtue of the logging endpoint, code written for execution on the on-demand code execution environment may appear similar to that written for other environments while being handled different from code written for other environments.

In some instances, the logging endpoint may operate asynchronously to a task execution, thus reducing concerns that may exist with respect to logging in other environments. For example, asynchronous operation of the logging endpoint may reduce or eliminate the need for a creator of code to be concerned with, for example, an amount of data written to a disk during a task execution, or with later collecting and writing that information to a log file. In some instances, use of a logging endpoint may eliminate the need for a task execution (or runtime) to write log data to disk of a local execution environment.

As will be appreciated by one of skill in the art in light of the present disclosure, the embodiments disclosed herein improves the ability of computing systems, such as on-demand code execution systems, to execute code in an efficient manner. Moreover, the presently disclosed embodiments address technical problems inherent within computing systems; specifically, limited nature of compute resources with which to execute code and the inefficiency and difficulty of handling code executing in different run-time environments. These technical problems are addressed by the various technical solutions described herein, including the implementation of an on-demand code execution system that provides a logging endpoint, enabling enrichment of log data received from executing code while minimizing the functionality that must be provided within such code in order to write log data. Thus, the present disclosure represents an improvement on existing data processing systems and computing systems in general.

The general execution of tasks on the on-demand code execution system will now be discussed. Specifically, to execute tasks, the on-demand code execution system described herein may maintain a pool of pre-initialized virtual machine instances or other execution environments that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution system may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programming interfaces (API), and/or other programmatic interfaces for generating and uploading user-executable code, invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. As described below, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to store user-submitted runtimes to be provisioned into an execution environment, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus over-paying). In accordance with embodiments of the present disclosure, the tasks established by a user may correspond to code executable to implement "map" and "reduce" functions with respect to a data set.

To enable interaction with the on-demand code execution system 110, the environment 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface 122 providing user computing devices 102 with the ability to upload or otherwise communication user-specified code to the on-demand code execution system 110 and to thereafter request execution of that code. In one embodiment, the request interface 122 communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface 122). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further includes an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

As shown in FIG. 1, in some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the warming pools 130A or active pools 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more warming pool managers 130, which "pre-warm" (e.g., initialize) virtual machine instances to enable tasks to be executed quickly, without the delay caused by initialization of the virtual machines. The on-demand code execution system 110 further includes one or more worker managers 140, which manage active virtual machine instances (e.g., currently assigned to execute tasks in response to task calls).

The warming pool managers 130 ensure that virtual machine instances are ready to be used by the worker managers 140 when the on-demand code execution system 110 detects an event triggering execution of a task on the on-demand code execution system 110. In the example illustrated in FIG. 1, each warming pool manager 130 manages a corresponding warming pool 130A, which is a group (sometimes referred to as a pool) of pre-initialized and pre-configured virtual machine instances that may be used to execute tasks in response to triggering of those tasks. In some embodiments, the warming pool managers 130 cause virtual machine instances to be booted up on one or more physical computing machines within the on-demand code execution system 110 and added to a corresponding warming pool 130A. For example, each warming pool manager 130 may cause additional instances to be added to the corresponding warming pool 130A based on the available capacity in the corresponding warming pool 130A to service incoming calls. As will be described below, the warming pool managers 130 may further work in conjunction with other components of the on-demand code execution system 110, such as the worker managers 140, to add or otherwise manage instances and/or containers in the warming pools 130A based on received pre-trigger notifications. In some embodiments, the warming pool managers 130 may use both physical computing devices within the on-demand code execution system 110 and one or more virtual machine instance services to acquire and maintain compute capacity that can be used to service calls received by the frontends 120. Further, the on-demand code execution system 110 may comprise one or more logical knobs or switches for controlling (e.g., increasing or decreasing) the available capacity in the warming pools 130A. For example, a system administrator may use such a knob or switch to increase the capacity available (e.g., the number of pre-booted instances) in the warming pools 130A during peak hours. In some embodiments, virtual machine instances in the warming pools 130A can be configured based on a predetermined set of configurations independent from a specific call to execute a task. The predetermined set of configurations can correspond to various types of virtual machine instances to execute tasks. The warming pool managers 130 can optimize types and numbers of virtual machine instances in the warming pools 130A based on one or more metrics related to current or previous task executions. Further, the warming pool managers 130 can establish or modify the types and number of virtual machine instances in the warming pools 130A based on pre-trigger notifications (e.g., by pre-initializing one or more virtual machine instances based on requirements of a task expected to be executed based on a received pre-trigger notification).

As shown in FIG. 1, instances may have operating systems (OS) and/or language runtimes loaded thereon. For example, the warming pool 130A managed by a warming pool manager 130 can comprise instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool managers 130 may maintain a list of instances in a corresponding warming pool 130A. The list of instances may further specify the configuration (e.g., OS, runtime, container, etc.) of the instances.

In some embodiments, the virtual machine instances in a warming pool 130A may be used to serve any user's calls. In one embodiment, all the virtual machine instances in a warming pool 130A are configured in the same or substantially similar manner. In another embodiment, the virtual machine instances in a warming pool 130A may be configured differently to suit the needs of different users. For example, the virtual machine instances may have different operating systems, different language runtimes, and/or different libraries loaded thereon. In yet another embodiment, the virtual machine instances in a warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby.

The warming pool managers 130 may pre-configure the virtual machine instances in a warming pool 130A, such that each virtual machine instance is configured to satisfy at least one of the operating conditions that may be requested or specified by a user when defining a task. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution system 110, the user interface may prompt the user to specify one of the predetermined operating conditions for executing the task. In another example, the service-level agreement (SLA) for utilizing the services provided by the on-demand code execution system 110 may specify a set of conditions (e.g., programming languages, computing resources, etc.) that tasks should satisfy, and the on-demand code execution system 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pools 130A are usable by which user), among other specified conditions.

One or more worker managers 140 manage the instances used for servicing incoming calls to execute tasks. In the example illustrated in FIG. 1, each worker managers 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool 130A (e.g., including the number and type of instances). In other embodiments, the worker managers 140 requests compute capacity from a warming pool manager 130 without having knowledge of the virtual machine instances in a warming pool 130A.

In the example illustrated in FIG. 1, tasks are executed in isolated execution environments referred to as containers (e.g., containers 156D, 156E, 158D). Containers are logical units created within a virtual machine instance using the resources available on that instance. For example, each worker manager 140 may, based on information specified in a call to execute a task, create a new container or locate an existing container in one of the instances in an active pool 140A and assigns the container to the call to handle the execution of the task. In one embodiment, such containers are implemented as Linux containers.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector 126 configured to determine a worker manager 140 to which to pass the execution request. Illustratively, to assist in implementation of execution guarantees, the location selector 126 to select the same worker manager 140 to receive each call to a task to the same worker manager 140, such that the worker manager 140 can maintain an authoritative execution record for the task. In one embodiment, the location selector 126 may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

On receiving a request to execute a task, a worker manager 140 finds capacity to execute a task on the on-demand code execution system 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the user code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the user code of the task to be downloaded and executed on the container.

In some embodiments, the on-demand code execution system 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution system 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution system 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution system 110 may maintain a separate cache in which code of tasks are stored to serve as an intermediate level of caching system between the local cache of the virtual machine instances and the account data store 164 (or other network-based storage not shown in FIG. 1). The various scenarios that the worker manager 140 may encounter in servicing the call are described in greater detail within the '556 Patent, incorporated by reference above (e.g., at FIG. 4 of the '556 Patent).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution system 110 may provide data to one or more of the auxiliary services 106 as it executes tasks in response to triggering events. For example, the frontends 120 may communicate with the monitoring/logging/billing services included within the auxiliary services 106. The monitoring/logging/billing services may include: a monitoring service for managing monitoring information received from the on-demand code execution system 110, such as statuses of containers and instances on the on-demand code execution system 110; a logging service for managing logging information received from the on-demand code execution system 110, such as activities performed by containers and instances on the on-demand code execution system 110; and a billing service for generating billing information associated with executing user code on the on-demand code execution system 110 (e.g., based on the monitoring information and/or the logging information managed by the monitoring service and the logging service). In addition to the system-level activities that may be performed by the monitoring/logging/billing services (e.g., on behalf of the on-demand code execution system 110), the monitoring/logging/billing services may provide application-level services on behalf of the tasks executed on the on-demand code execution system 110. For example, the monitoring/logging/billing services may monitor and/or log various inputs, outputs, or other data and parameters on behalf of the tasks being executed on the on-demand code execution system 110.

In some embodiments, the worker managers 140 may perform health checks on the instances and containers managed by the worker managers 140 (e.g., those in a corresponding active pool 140A). For example, the health checks performed by a worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, a worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, a worker manager 140 may perform similar health checks on the instances and/or containers in a warming pool 130A. The instances and/or the containers in a warming pool 130A may be managed either together with those instances and containers in an active pool 140A or separately. In some embodiments, in the case where the health of the instances and/or the containers in a warming pool 130A is managed separately from an active pool 140A, a warming pool manager 130, instead of a worker manager 140, may perform the health checks described above on the instances and/or the containers in a warming pool 130A.

In the depicted example, virtual machine instances ("instances") 152, 154 are shown in a warming pool 130A managed by a warming pool manager 130, and instances 156, 158 are shown in an active pool 140A managed by a worker manager 140. The illustration of the various components within the on-demand code execution system 110 is logical in nature and one or more of the components can be implemented by a single computing device or multiple computing devices. For example, the instances 152, 154, 156, 158 can be implemented on one or more physical computing devices in different various geographic regions. Similarly, each frontend 120, warming pool manager 130, and worker manager 140 can be implemented across multiple physical computing devices. Alternatively, one or more of a frontend 120, a warming pool manager 130, and a worker manager 140 can be implemented on a single physical computing device. Although four virtual machine instances are shown in the example of FIG. 1, the embodiments described herein are not limited as such, and one skilled in the art will appreciate that the on-demand code execution system 110 may comprise any number of virtual machine instances implemented using any number of physical computing devices. Similarly, although multiple warming pools 130A and active pools 140A are shown in the example of FIG. 1, the embodiments described herein are not limited as such, and one skilled in the art will appreciate that the on-demand code execution system 110 may comprise any number of warming pools and active pools.

the on-demand code execution system 110 may further provide, or enable user submission of, various different runtimes (e.g., supporting various different programming languages). Illustratively, where a user wishes the on-demand code execution system 110 to execute a task written in the Ruby programming language, but the on-demand code execution system 110 does not currently support such a language, the user may submit a runtime enabling execution of code written in the Ruby language. That runtime may include, for example, a ruby interpreter formatted for execution within an operating system implemented by the on-demand code execution system 110 (e.g., Linux). In some instances, the on-demand code execution system 110 may provide libraries or modules formatted for use in a variety of programming languages, which implement various functionalities of execution environments within the on-demand code execution system 110 (e.g., retrieval of a task, execution of code of the task, reporting of results, etc.). Thus, a user may include a relatively small amount of code within the desired programming language in order to implement such libraries or modules. Thereafter, the on-demand code execution system 110 may enable the user to submit tasks written in the desired programming language, which the on-demand code execution system 110 may execute within an execution environment provisioned with the user-submitted runtime. In some instances, in addition or as an alternative to providing libraries or modules, the on-demand code execution system 110 may provide a specification for implementing functionalities of execution environments within the on-demand code execution system 110 (e.g., retrieval of a task, execution of code of the task, reporting of results, etc.). The specification may, for example, require use of a widely available communication protocol, such as the HTTP protocol, to implement these functionalities. For example, the specification may specify an application programming interface (API) through which information corresponding to these functionalities is retrieved, and specify various aspects of the functionalities (e.g., a time to complete each functionality). In one embodiment, the API may be designed as a representational state transfer (REST) architecture API. The prevalence of a widely available communication protocol may enable rapid development of user-submitted runtimes according to the specification.

As used herein, "runtime" is intended to refer to a collection of software enabling execution of user-submitted code (e.g., on a device of the on-demand code execution system 110, such as a virtual machine running a Linux operating system). The collection of software may include, for example, one or more executables, compilers, interpreters, drivers, software development kits (SDKs), libraries, modules, or the like, which facilitate execution of code. A runtime may support execution of code within more than one language. For example, a given runtime may include software enabling execution of both Python- and C++- language code. Moreover, multiple runtimes may be created supporting execution of code within a given language. For example, a first runtime may support execution of code written in the Python language, while a second runtime supports execution of code written for use with the "SciPy" programming language, built using the Python language. Thus, various runtimes may be created to facilitate expected environments in which code will execute. The runtimes may be packaged in various formats or filetypes. For example, a runtime may be created as a software container file, or a compressed file system image. Thus, the on-demand code execution system 110 may provision an environment with the runtime by creating an execution environment (e.g., a software container) based on the software container file or compressed file system image. Each task may reference its desired runtime within metadata of the task (e.g., within a manifest file for the task). In some instances, the on-demand code execution system 110 may implement various additional functionalities to enable efficient execution of code depending on a desired runtime or other separately submitted data objects, as discussed in detail within U.S. patent application Ser. No. 15/841,143, entitled "DEPENDENCY HANDLING IN AN ON-DEMAND NETWORK CODE EXECUTION SYSTEM" and filed on Dec. 13, 2017 (the '143 Application"), the entirely of which is incorporated by reference herein.

In one embodiment, each runtime may be required by the on-demand code execution system 110 to implement a pull-based request handler, which retrieves requests to execute a task and processes the requests accordingly. By utilization of a pull-based request handler, many functionalities of the on-demand code execution system 110 may be implemented externally to a runtime, rather than requiring the runtime itself to implement such functionalities. For example, in a push-based request system (e.g., where instructions to execute a task are "pushed" to an environment provisioned with a runtime), each runtime might be required to implement their own throttling functionality, or to request provisioning of additional environments when a rate of requests exceeds a rate of processing at the environment. However, by utilizing a pull-based request handler, an environment implementing a runtime may be required simply to retrieve and process requests to execute tasks at whatever rate it is capable of, and the on-demand code execution system 110 may separately implement throttling functionalities, scaling functionalities, etc. Because the on-demand code execution system 110 may enable users or other sources to "push" requests to execute code to the system 110, the system 110 might in such instances be considered to "invert" the data flow for requests, acting as a broker to match pushed requests to execute a task with open "pulls" from request handlers in available execution environments. Moreover, as discussed in more detail below, the on-demand code execution system 110 may utilize information regarding received requests to execute code (representing "demand" for various runtimes) and open "pulls" from request handlers (representing "supply" of various runtimes) to manage proportions of various runtimes maintained at the on-demand code execution system 110. Illustratively, the on-demand code execution system 110 may implement task queues for each of a number of supported runtimes, and modify a number of execution environments provisioned with a given runtime based on a size of a task queue corresponding to the runtime or a rate of change of that task queue. Thus, the on-demand code execution system 110 may enable user-creation of any of a variety of runtimes, while maintaining efficient operation of the system 110 and with minimum requirements to the runtimes themselves.

In accordance with embodiments of the present disclosure, the on-demand code execution system 110 further includes one or more logging endpoints 160 to which task executions (e.g., within the active pool 140A) may transmit data, such as error or logging data, to be stored for later use (e.g., at the data storage service 108 or other auxiliary service 106). In one embodiment, each physical host computing device within the active pool 140A is associated with a distinct logging endpoint 160 executing on the host. In another embodiment, each collection of physical host computing devices within the active pool 140A (e.g., devices within a common "rack" or data center) is associated with a distinct logging endpoint 160. The logging endpoints 160 may implement functionalities as discussed herein, such as the reception of log data from a task execution, the enrichment of the log data with additional information (and potentially information not accessible to a task execution), and the storage of the enriched log data for subsequent retrieval. In one embodiment, the logging endpoints 160 may provide an API, which may be a REST architecture API, through which task executions can transmit log data to the logging endpoints 160. Thus, the logging endpoints 160 can simplify development of tasks on the on-demand code execution system 110 and make additional data regarding operation of the on-demand code execution system 110 available to end users in order to facilitate development of tasks on the on-demand code execution system 110.

While some functionalities are generally described herein with reference to an individual component of the on-demand code execution system 110, other components or a combination of components may additionally or alternatively implement such functionalities. For example, while a logging endpoint 160 may operate to enrich and cause storage of log data, a frontend 140, worker manager 140, or virtual machine instance may additionally or alternatively facilitate enrichment and storage of such data.

Figure 2:
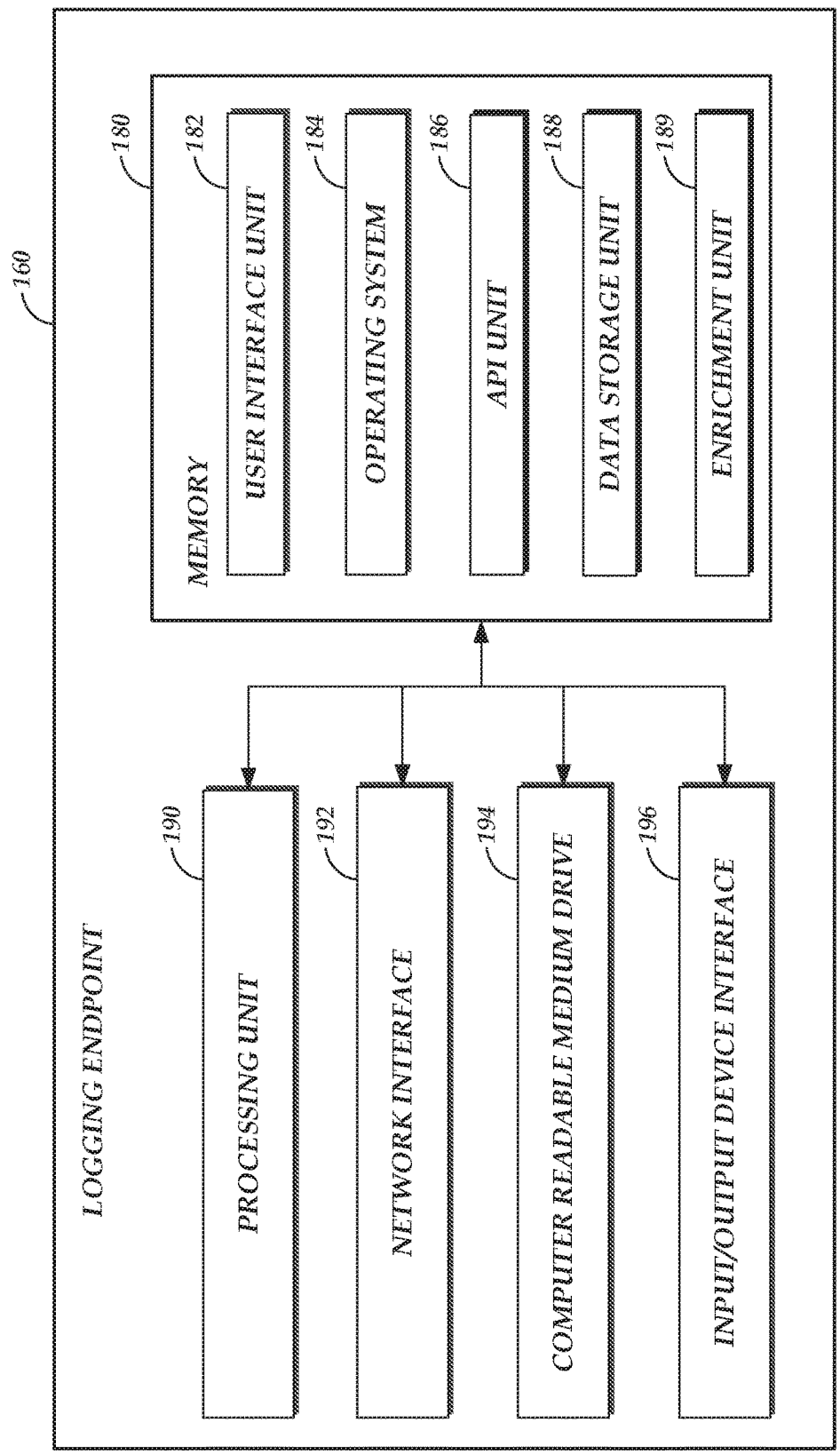
FIG. 2 depicts a general architecture of a computing device providing a logging endpoint that is configured to facilitate logging of data from tasks executing on the on-demand code execution system of FIG. 1.

FIG. 2 depicts a general architecture of a computing system (referenced as logging endpoint 160) that functions to facilitate enrichment and storage of log data from a task execution executing on the on-demand code execution system 110. The general architecture of the logging endpoint 160 depicted in FIG. 2 includes an arrangement of computer hardware and software modules that may be used to implement aspects of the present disclosure. The hardware modules may be implemented with physical electronic devices, as discussed in greater detail below. The logging endpoint 160 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the logging endpoint 160 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes random access memory (RAM), read only memory (ROM) and/or other persistent, auxiliary or non-transitory computer readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include an API unit 186, enrichment unit 189, and data storage unit 188 that may be executed by the processing unit 190. In one embodiment, the API unit 186, enrichment unit 189, and data storage unit 188 individually or collectively implement various aspects of the present disclosure, e.g., facilitating enrichment and storage of log data received from task executions. For example, the API unit 186 may be executed by the processing unit 190 in order to provide an API (e.g., a REST HTTP API) through which task executions may pass log data to the logging endpoint 160 in a standardized or uniform manner. The enrichment unit 189 may be executed by the processing unit 190 to gather additional data used to enrich the log data, such as data regarding the task execution or a state of the on-demand code execution system 110 when executing a task. The processing unit 190 may execute the storage unit 188 to store the enriched log data, such as at the data storage service 108. In some instances, the processing unit 190 may facilitate that storage by, for example, authenticating with the data storage service 108 on behalf of the task execution.

While the API unit 186, enrichment unit 189, and data storage unit 188 are shown in FIG. 2 as part of the logging endpoint 160, in other embodiments, all or a portion of the API unit 186, enrichment unit 189, and data storage unit 188 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the logging endpoint 160.

In some embodiments, the logging endpoint 160 may further include components other than those illustrated in FIG. 2. For example, the memory 180 may further include a container manager for managing creation, preparation, and configuration of containers within virtual machine instances, such as based on task queues associated with a variety of different runtimes submitted to or available on the on-demand code execution system 110.

Figure 3:
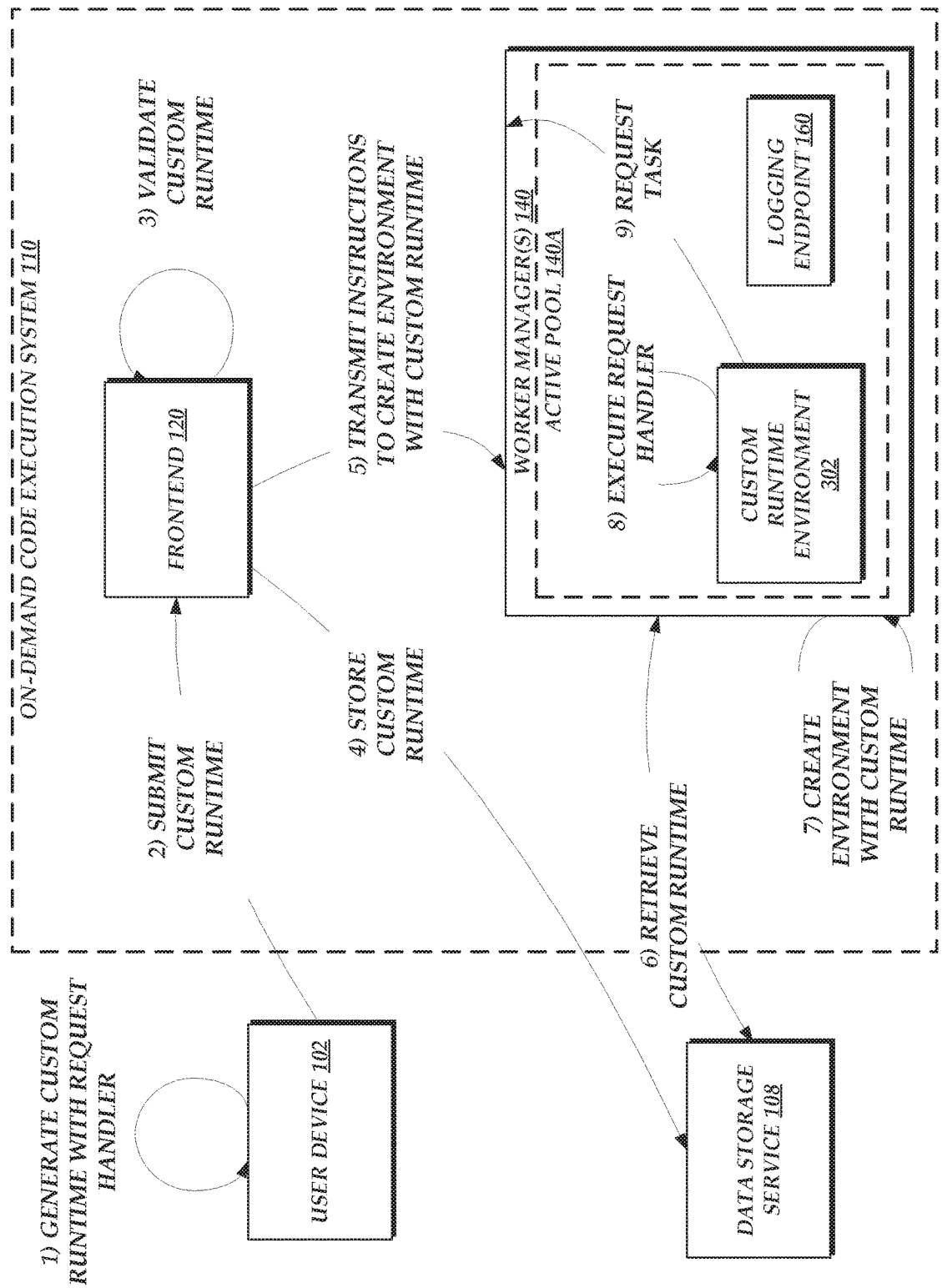
FIG. 3 is a flow diagram depicting illustrative interactions for submitting a custom runtime to the on-demand code execution system of FIG. 1.

With reference to FIG. 3, illustrative interactions are depicted for provisioning of an execution environment on the on-demand code execution system 110 with a custom runtime provided by a user device 102. The custom runtime may represent, by way of non-limiting example, software enabling execution of code within a programming language previously unsupported on the on-demand code execution system 110.

The interactions of FIG. 3 begin at (1), where the user device 102 generates the custom runtime. Illustratively, a user of the user device may create a runtime file (e.g., a software container) executable within an operating system implemented on the on-demand code execution system 110, and include within the runtime file software enabling execution of desired code (e.g., an interpreter or compiler for the code, libraries, SDKs, drivers, etc.). In the illustrative example of FIG. 3, the custom runtime further includes software enabling various functionalities of runtimes within the on-demand code execution system 110. Specifically, the runtime may include a pull-based request handler enabling the runtime (when executed) to request instructions to execute a task on the on-demand code execution system 110 and to report results of that execution. In one embodiment, the pull-based request handler is included within the runtime by including, within the runtime file, a library provided to the user device 102 by the on-demand code execution system 110. In another embodiment, the pull-based request handler is included within the runtime by including, within the runtime file, code (e.g., source code, machine code, etc.) generated by a user of the user device 102 or by a third party according to a specification provided by the on-demand code execution system 110 (e.g., a REST API specification).

Thereafter, at (2), the user device 102 submits the custom runtime to the frontend 120, for inclusion on the on-demand code execution system 110. Illustratively, the user device 102 may access an API or other interface provided by the frontend 120 for submission of custom runtimes. In some instances, the user device 102 may further specify permissions or authorizations required to access the runtime, in accordance with embodiments of the '143 Application, incorporated by reference above. At (3), the frontend 120 validates the runtime, such as by inspecting the format of a file containing the runtime to ensure compliance with requirements for runtimes on the on-demand code execution system 110. Thereafter, at (4), the frontend 120 stores the runtime on the data storage service 108 for subsequent use on the on-demand code execution system 110.

In addition, at (5), the frontend 120 transmits to a worker manager 140 instructions to create an execution environment provisioned with the custom runtime. While described subsequent to interaction (4), interaction (5) may occur in any order with respect to interaction (4). In some embodiments, these interactions may occur concurrently or nearly concurrently. In other embodiments, interaction (5) may occur independently of, and potentially with a significant delay after, interaction (4). For example, the frontend 120 may transmit instructions to create an environment with the custom runtime based on an expected demand for that runtime, or based on detected or predicted requests to execute tasks depending on the runtime. Illustrative mechanisms for predicting requests to execute tasks are described, for example, in U.S. patent application Ser. No. 14/971,934, entitled "PRE-TRIGGERS FOR CODE EXECUTION ENVIRONMENTS" and filed Dec. 16, 2015. In one embodiment, the instructions to create an environment with a custom runtime may be implicitly included within instructions to execute a task depending on that runtime, such that explicit instructions to create an environment with a custom runtime need not be transmitted from the frontend 120.

In response to the instructions, the worker manager 140, at (6), retrieves the custom runtime from the data storage service 108. Thereafter, at (7), the worker manager 140 generates a custom runtime environment 302 within the active pool 140A based on the custom runtime. Generation of the custom runtime environment 302 may include, for example, generation of a container based on a container file corresponding to the custom runtime, or provisioning of a container with access to a file system generated based on a compressed file system image corresponding to the runtime. The interactions of a worker manager 140 to create and provision an execution environment (e.g., a container or virtual machine instance) are described in more detail within the '556 Patent, incorporated by reference above.

As noted above, the illustrative custom runtime of FIG. 3 includes a pull-based request handler. As such, when the custom runtime is provisioned into an execution environment, resulting in the custom runtime environment 302, the custom runtime environment (e.g., by executing code corresponding to the request handler) may initiate a pull request to the worker manager 140 to obtain instructions to execute a task. In one embodiment, the pull request is an HTTP request utilizing "long polling" techniques, whereby a window for response to the request is set at a relatively long duration (e.g., on the order of minutes), such that the worker manager 140 may respond to the request when a response to the request becomes available (e.g., when the on-demand code execution system 110 receives a request to execute a task depending on the custom runtime). While the request is illustrated in FIG. 3 as directed to the worker manager 140, the request may be directed to additional or alternative components of the on-demand code execution system 110, such as the frontend 120. In one embodiment, the request is directed to a uniform resource identifier (URI) associated with a logical queue of task execution requests for the custom runtime (which URI may include, for example, an identifier of the custom runtime on the on-demand code execution system 110). Advantageously, use of such a URI may enable the on-demand code execution system 110 to redirect requests from custom runtime environments based on manipulation of network routing within the on-demand code execution system 110, and potentially without modifying the custom runtime. For example, use of a URI to direct requests for execution instructions may enable the on-demand code execution system 110 to redirect those requests by modifying domain name system (DNS) records for the URI, without otherwise altering the custom runtime or operation of the custom runtime environment 302.

Thus, by virtue of the interactions of FIG. 3, a user-defined custom runtime may be implemented within the on-demand code execution system 110, and made available to execute a task depending on that runtime.

Figure 4:
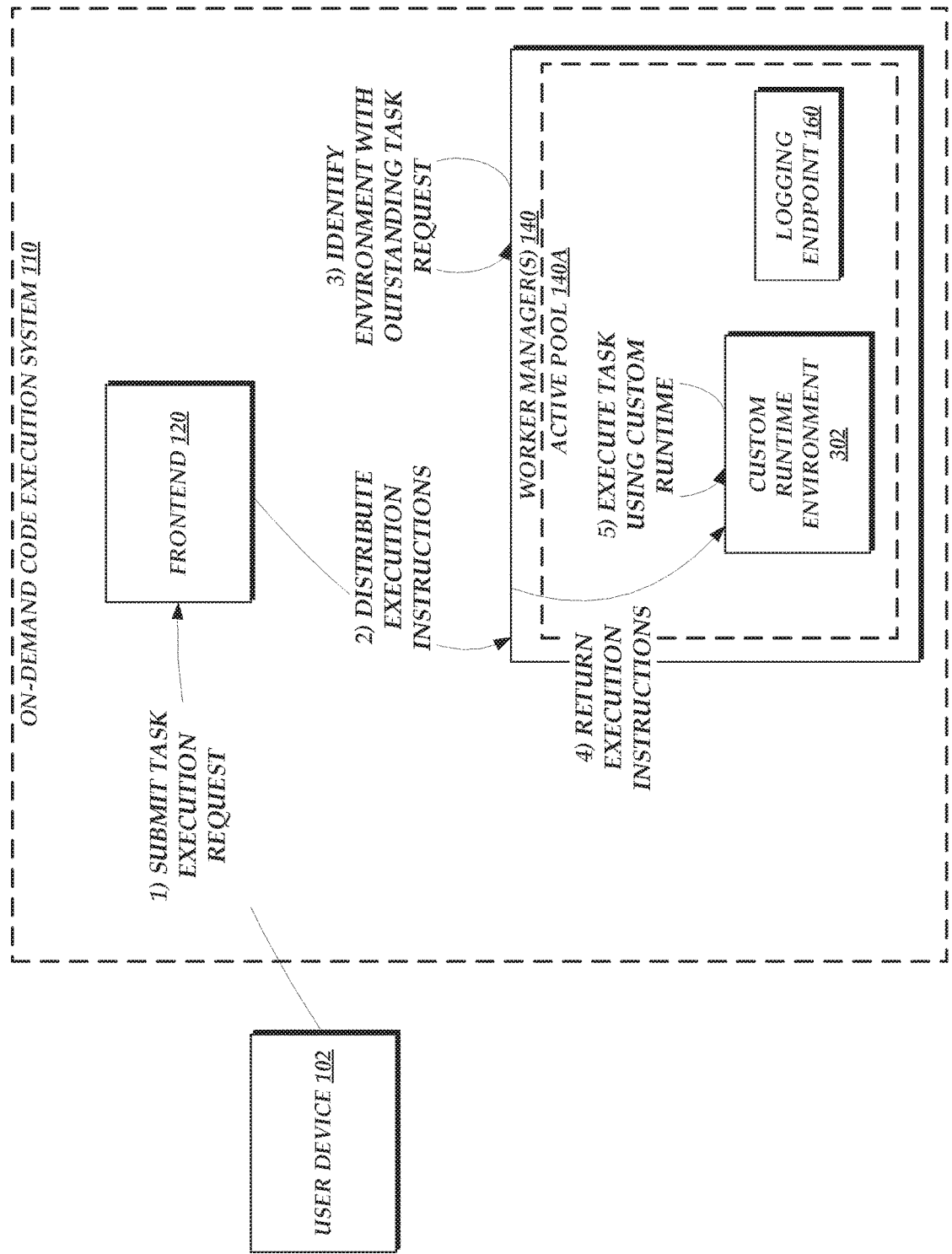
FIG. 4 is a flow diagram depicting illustrative interactions for executing a task within an environment provisioned with a custom runtime on the on-demand code execution system of FIG. 1.

With reference to FIG. 4, illustrative interactions will be described for executing a task dependent on a custom runtime within the on-demand code execution system 110. The interactions of FIG. 4 may occur, for example, subsequent to the interactions of FIG. 3. Thus, reference numerals of FIG. 3 are maintained within FIG. 4. However, one skilled in the art will appreciate, in light of the present disclosure, that the interactions of FIG. 4 may also occur independently of the interactions of FIG. 3.

The interactions of FIG. 4 begin at (1), where the user device 102 submits a request to the frontend 120 to execute a task. While transmission of an execution request is shown in FIG. 4 as generated at a user device 102, task execution requests may additionally or alternatively be submitted by other sources, such as third-party devices or a device of the on-demand code execution system 110.

At (2), the frontend 120 determines dependencies for the task. Illustratively, the frontend 120 may identify a manifest for the task, and inspect the manifest to determine a runtime associated with execution of the task. Illustrative mechanisms for determining dependencies of a task are described in more detail within the '143 Application, incorporated by reference above. For purposes of the present description, it will be assumed that the task for which execution is requested depends on the custom runtime of FIG. 3, and thus should be executed within an environment provisioned with the custom runtime.

At (3), the frontend 120 distributes to a worker manager 140 instructions to execute the task identified within the request. In one embodiment, the on-demand code execution system 110 includes multiple worker managers 140, and the frontend 120 is configured to distribute requests dependent on a given runtime to a given set of one or more frontends 120. Illustratively, the frontend 120 may be configured to apply a consistent hashing algorithm to an identifier of the runtime, and to distribute instructions to execute the task based on a result of that hashing algorithm. Consistent distribution of requests may enable more efficient operation of the on-demand code execution system 110, for example, by increasing the likelihood that execution environments within an active pool 140A of the worker manager 140 may be reused, reducing the likelihood that information (such as a file representing a runtime) must be transferred over a network to the active pool 140A, etc. In another embodiment, the frontend 120 may distribute execution instructions in other manners, such as by load balancing requests across worker managers 140, randomly distributing requests, or the like.

At (3), the worker manager 140 identifies an environment provisioned with an appropriate runtime to execute the task, and for which an outstanding request for execution instructions exist. In the instance that no environment is identified at interaction (3) (e.g., because all appropriate environments are busy executing other tasks), the worker manager 140 may place the task execution instructions into a queue associated with the runtime. The queue may operate on a first-in-first-out (FIFO) basis, such that when the task execution instructions reach the head of the queue, they are return to a next appropriate environment that submits a request for execution instructions to the worker manager 140.

For the purposes of description of FIG. 4, it will be assumed that custom runtime environment 302 is identified at interaction (3), either immediately or after being processed through a queue, as described above. Thus, the worker manager 140, at (4), returns to the custom runtime environment 302, as a response to the prior request for execution instructions, instructions to execute the task as identified within the request of the user device 102. Illustratively, the response provided by the worker manager 140 may include an identifier of the execution request, or details of the request, such as an identifier of the task, parameters passed within the request, or the like. As noted above, the response may be formatted as a transmission of a REST-compliant API.

At (5), the custom runtime environment 302, based on software included within the custom runtime, executes the task, thus fulfilling the request of the user device 102. Execution of tasks may include a number of functionalities, such as retrieving details of the task execution (e.g., via the REST-compliant AP), provisioning the custom runtime environment 302 with code of additional dependencies, and initiating execution of code corresponding to the task. Execution of code within an environment of the on-demand code execution system 110 is described in more detail within the '143 Application, incorporated by reference above.

Figure 5:
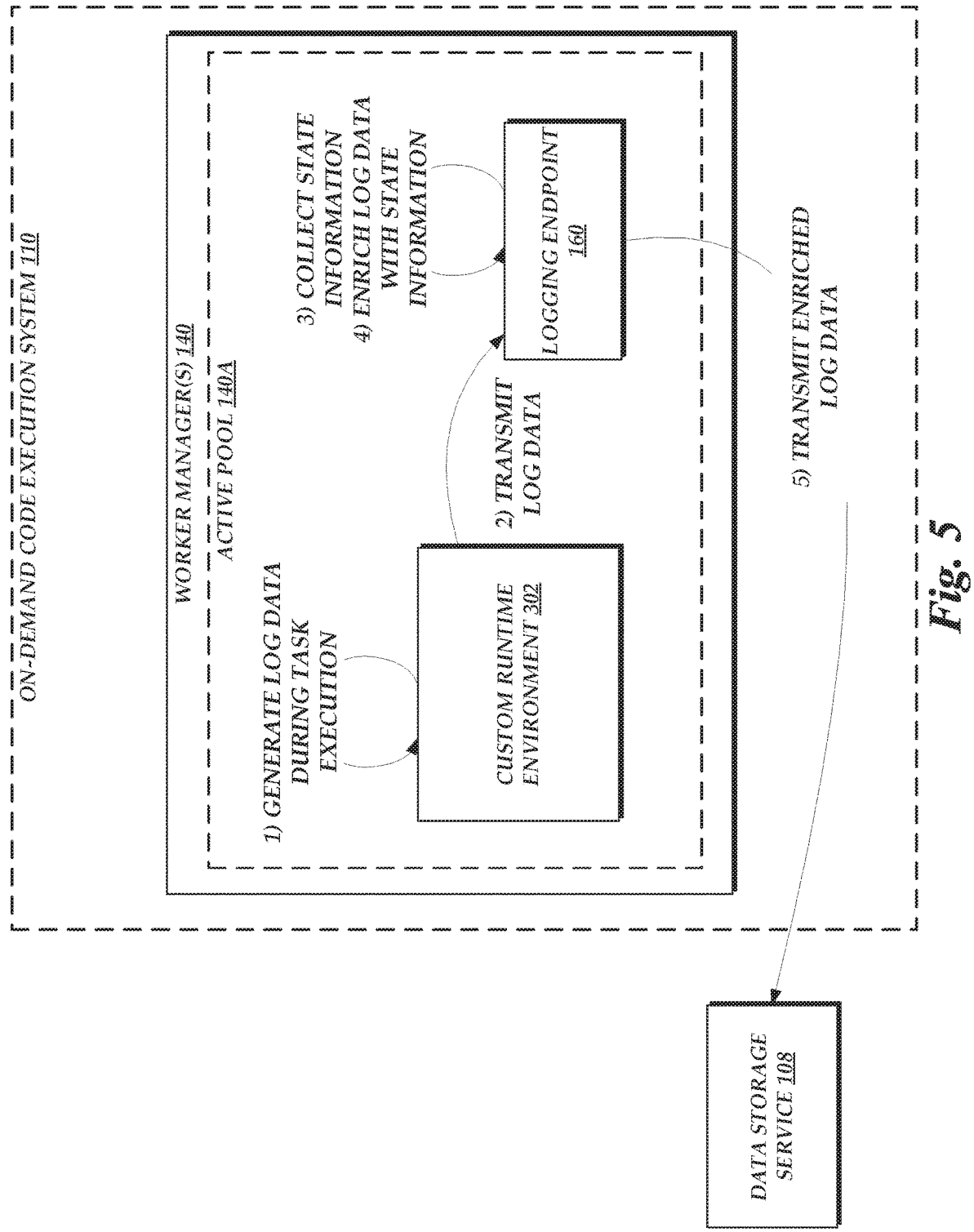
FIG. 5 is a flow diagram depicting illustrative interactions for obtaining log data from a task execution on the on-demand code execution system of FIG. 1, enriching the data with information regarding a state of the task execution, and storing the enriched data.

With reference to FIG. 5, illustrative interactions will be described for operation of a logging endpoint 160 to receive and enrich data from a task execution, such as a task executing within the custom runtime environment 302, and to store the enriched log data for subsequent retrieval, such as within a data storage service 108. The interactions of FIG. 5 may illustratively occur subsequent to those of FIG. 4, during execution of a task within the environment 302. Illustratively, during execution of a task, code of the task may cause log data (such as error data) to be generated within the environment, as shown at (1). In one embodiment, the log data may be generated based on task code authored by an owner of the task. In another embodiment, the log data may be generated based on the runtime on which the task executes (e.g., as an automatic operation of that runtime when executing code of the task). Thereafter, at (2), the task execution transmits the log data to the logging endpoint 160. In one embodiment, the task execution transmits the log data via a commonly-used protocol, such as HTTP, such that multiple tasks (potentially authored in different programming languages) are enabled to transmit log data to the logging endpoint 160 via a common protocol. Illustratively, code of the task (e.g., as authored by an owner of the task or as included by virtue of the task's dependency on a runtime) may include a call that causes transmission of HTTP data, including the log data, to a URI associated with a logging endpoint 160. In one embodiment, the worker manager 140 (or a physical computing device hosting the environment 302) causes this transmission of HTTP data to be routed to a proximate logging endpoint 160, such as an endpoint 160 executing on the same host as the environment 302, via manipulation of DNS information for the environment 302. For example, the worker manager 140 may implement a DNS server that maintains an IP address of the logging endpoint 160, and returns that address in response to a DNS query for the URI included within the task's code. Thus, transmission of HTTP data to the URI is expected to be routed to a desired logging endpoint 160 without requiring alteration of the task's code to facilitate such routing.

At (2), on receiving log data from a task execution, the logging endpoint 160 collects state information that can be used to enrich the log data. State information can include, for example, information as to the log data, the task execution, a state of the environment 302, a state of a virtual machine instance hosting the environment 302 (e.g., where the environment 302 is a software container), a state of a physical computing device hosting the environment 302 (e.g., directly or by virtue of hosting a virtual machine instance hosting the environment 302), or a state of the on-demand code execution system 110. Information regarding the log data may include, for example, a time of reception of the log data (which may be used, for example, to reduce or eliminate a need to include timestamp information within the log data). Information regarding the task execution may include, for example, an identifier of the task execution, information regarding the request to execute the task (e.g., a source of the request, parameters of the request, etc.), a beginning time of the task execution, or a duration of the task execution. Information regarding a state of the environment 302 may include, for example, resource usage of the environment 302, resource levels available at the environment 302, a configuration of the environment 302, a time of creation of the environment 302, a number of tasks previously or concurrently executing in the environment 302, or a runtime or other dependency provisioned into the environment 302. Information regarding the state of a virtual machine instance may include, for example, resource usage of the virtual machine instance, resources available to the virtual machine instance, a configuration of the virtual machine instance, a time of creation of the virtual machine instance, a number of environments previously or hosted within the virtual machine instance, a number of task executions current or previously occurring on the virtual machine instance, or information provisioned into the virtual machine instance. Information regarding the state of a host physical computing device may include, for example, resource usage of the host physical computing device, resources available to the host physical computing device, a configuration of the host physical computing device, an uptime of the host physical computing device, a number of environments or virtual machine instances previously or hosted within the host physical computing device, a number of task executions current or previously occurring on the host physical computing device, or information provisioned into the host physical computing device. Information regarding a state of the on-demand code execution system 110 may include, for example, a number of task executions, environments, virtual machine instances, or host physical computing devices operating as part of the on-demand code execution system 110 (e.g., on a per second, per minute, or per hour basis). In some instances, state information can further include information regarding a state of an auxiliary service 106, either independently or with respect to the on-demand code execution system 110. For example, state information may reflect computing resource usage of an auxiliary service 106 or resources available at the auxiliary service 106. Where an auxiliary service 106 imposes capacity constraints on the on-demand code execution system 110 (e.g., on the system 110 overall, on individual task executions or individual users, etc.), state information may include a remaining capacity of the auxiliary service 106 with respect to those constraints. In some instances, the logging endpoint 160 may have direct access to state information. In other instances, the logging endpoint 160 may query another device (e.g., the frontend 120) for state information.

At (4), the logging endpoint 160 enriches the received log data with the state information. In some instances, the received log data is enriched with one or more pre-determined types of state information. For example, an administrator of the on-demand code execution system 110, an author of a runtime, or an owner of a task may specify, outside of a task execution, that log data of the task execution be enriched with one or more types of state information. In other instances, the received log data is enriched with one or more types of state information specified by the task execution. For example, an HTTP request including the log data may specify one or more types of state information to be used to enrich the log data. Enrichment of log data may include any modification or addition to log data to include the state information. For example, where log data is textual data, enrichment of the log data may include appending state information to the textual log data or modifying the textual log data to otherwise include the state information.

At (5), the logging endpoint 160 transmits the enriched log data for storage, such as in the data storage service 108. In one embodiment, a location for storage of the enriched log data at the data storage service 108 may be pre-specified within the data storage service 108. For example, an owner of a task may specify, for the task, a specific data storage service 108 to utilize in storing enriched log data, a location at the data storage service 108 to be used to store the enriched log data (including, for example, whether and when to overwrite prior log data, such as to implement log rotation), and authentication information to be used in authenticating the logging endpoint 160 to the data storage service 108. In other embodiments, all or a portion of information related to the data storage service 108 may be specified or within code of the task being executed, and passed to the logging endpoint 160 as part of the log data. Thus, the logging endpoint 160 may utilize this information to cause storage of enriched log data at the data storage service 108.

Generally, because storage of log data may not be required to be completed during the lifetime of a task execution, interactions (3)-(5) may occur at various points in time, potentially after a task execution ceases. In some instances, there may be a one-to-one correspondence between reception of log data at the logging endpoint 160 and storage of enriched log data at the data storage service 108. In other instances, the logging endpoint 160 may store multiple items of enriched log data at the data storage service 108 via a single interaction with the data storage service 108. For example, the logging endpoint 160 may collect multiple items of log data, enrich the items, and "batch" the items for later storage at the data storage service 108.

While the interactions above are described with reference to storage at a data storage service 108, in some instances, the logging endpoint 160 may transmit enriched log data to additional or alternative locations. For example, in one embodiment, a second task may be maintained at the on-demand code execution system that, when executed, obtains enriched log data and causes storage of the enriched log data at the data storage service 108. The second task, when executed, may implement functionalities such as authentication with the data storage service 108 or formatting enriched log data for storage at the storage service 108. Thus, by transmitting enriched log data to such a second task, the logging endpoint 160 may not be required to itself implement these functionalities. In one embodiment, the on-demand code execution environment 110 may maintain multiple versions or instances of such tasks, each configured to receive enriched data and store the enriched data in different ways (e.g., according to different formats, at different data storage services 108, or the like). Thus, an owner of a log-data-generating task may, for example, specify to the on-demand code execution system 110 a particular second task to use in processing enriched log data from the initial task, in order to cause the enriched log data to be stored in a manner preferred by the owner.

In some instances, the logging endpoint 160 may transmit enriched log data to multiple locations. For example, the logging endpoint 160 may transmit a first set of log data to a first data storage service 108, enriched according to state information designated by an owner of the task. The logging endpoint 160 may further transmit a second set of log data to a second data storage service 108 (or to a second location of a data storage service 108) enriched with a second set of state information specified by an administrator of the on-demand code execution system 110. This information may be used, for example, to monitor operation of the on-demand code execution environment 110 in a manner that requires little or no additional control by the on-demand code execution environment 110 (e.g., because enriched log data is already being generated for the benefit of task owners).

Figure 6:
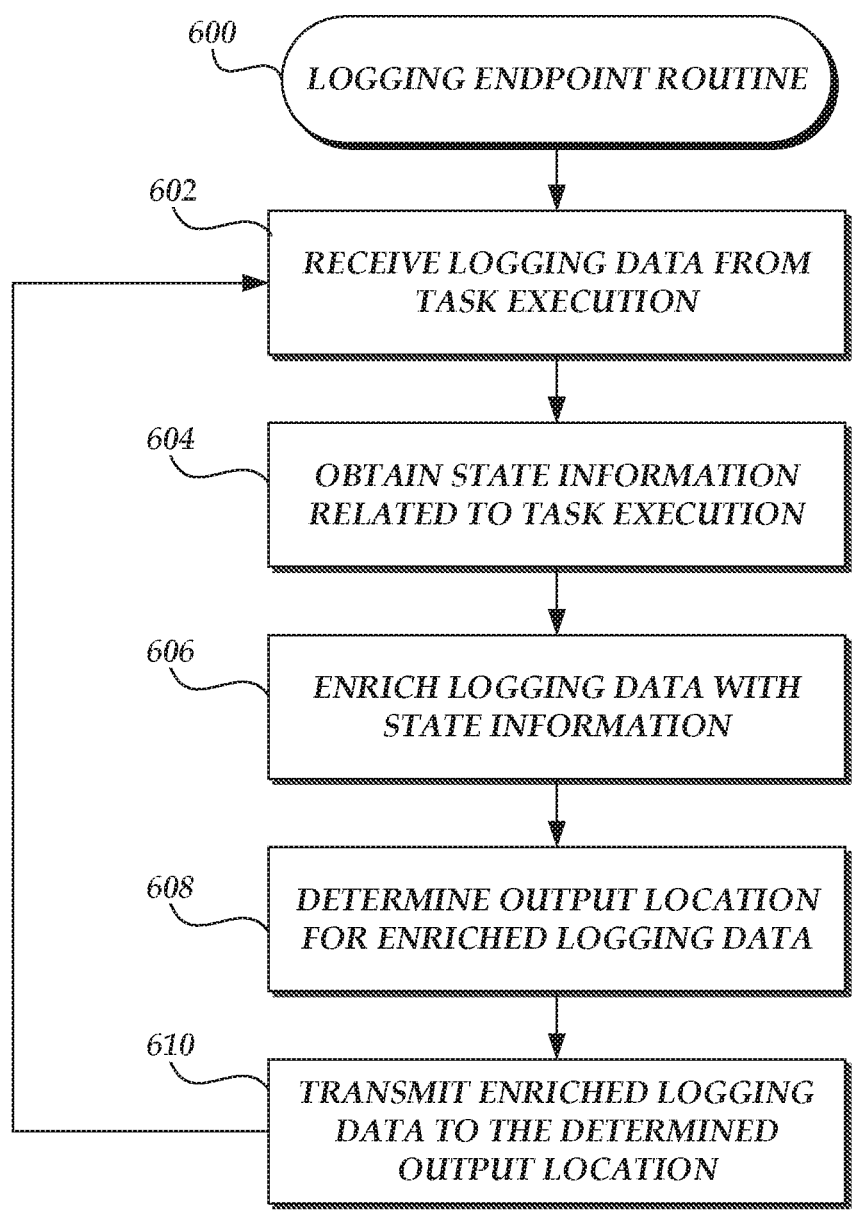
FIG. 6 is a flow chart depicting an illustrative routine for implementing logging functionality on on-demand code execution system of FIG. 1.

With reference to FIG. 6, an illustrative routine 600 will be described for generating enriched log data during execution of a task on an on-demand code execution system, such as the on-demand code execution system 110. The routine 600 may be carried out, for example, by a logging endpoint 160 of FIG. 1 (independently or in conjunction with other elements, such as a worker manager 140 or frontend 120).

The routine 600 begins at block 602, where the logging endpoint 160 receives log data from an execution of a task, such as error data (e.g., stack traces, thrown exceptions, etc.). In one embodiment, the log data is transmitted to the logging endpoint 160 by inclusion, within code of the task, of a function call that transmits information to an API of the logging endpoint 160, which may correspond to a REST API implemented via HTTP. As noted above, the log data may in some instances be routed to the logging endpoint 160 by operation of a DNS server of the on-demand code execution system 110, which may return a network address of the logging endpoint 160 to the task execution in response to a DNS query to resolve a URI associated with the logging endpoint 160. In one embodiment, the logging endpoint 160 operates proximate to an environment for the task execution, such as on the same host physical computing device (e.g., within a different container on a common virtual machine instance, within a different virtual machine instance, etc.). In some embodiments, the log data includes a specification of state information to be used to enrich the log data, as specified, for example, within code of the task.

At block 604, the logging endpoint 160 obtains state information related to the task execution. As noted above, this state information may include, for example, information as to the log data, the task execution, a state of the environment 302, a state of a virtual machine instance hosting the environment 302 (e.g., where the environment 302 is a software container), a state of a physical computing device hosting the environment 302 (e.g., directly or by virtue of hosting a virtual machine instance hosting the environment 302), or a state of the on-demand code execution system 110. In one embodiment, the logging endpoint 160 may be configured to directly obtain some or all state information (e.g., by virtue of executing on a host physical computing device and having access to information regarding operation of that device). In another embodiment, the logging endpoint 160 may infer some or all state information. For example, the logging endpoint 160 may infer a time stamp for the log data based on a time of receipt of the log data at the logging endpoint 160. In some instances, inferred information may be adjusted based on an expected accuracy of the inference. For example, timestamps may be adjusted based on an expected transmission time of log data between a task execution and the logging endpoint 160. However, where the logging endpoint 160 is sufficiently proximate to the task execution (e.g., within a 1-3 milliseconds of transmission time), no such adjustment may be necessary. The specific adjustments made by the logging endpoint to inferred log data, if any, may be specified by an administrator of the logging endpoint 160 based, for example, on a desired accuracy of enriched log data. In still other embodiments, the logging endpoint 160 may interact with other components to obtain state information. For example, the logging endpoint 160 may query a frontend 120 or worker manager 140 to obtain desired state information. In one embodiment, the types of state information are specified by an owner of the task, such as within code of the task or metadata related to the task. In another embodiment, the types of state information are specified by an administrator of the on-demand code execution system 110.

At block 606, the logging endpoint 160 enriches the received log data with the obtained state information. Enrichment may include, for example, modifying the log data to include the state information, appending state information to the log data, or otherwise generating an association between the log data with the state information. Illustratively, where the log data is textual data, the logging endpoint 160 may append state information to the textual data.

At block 608, the logging endpoint 160 determines an output location for the enriched log data. In one embodiment, the output location is network-accessible storage, such as storage made available via a storage service 108. In another embodiment, the output location is a second task execution on the on-demand code execution system 110, such as a task execution configured to obtain enriched log data and make the data available to an owner of the task. In yet another embodiment, the output location is another network location, such as a client computing device 102 (which may, for example, output the enriched log data in a streaming fashion). The output location may be specified, for example, within code of the task, as metadata for the task (e.g., established by an owner of the task), or by an administrator of the on-demand code execution system 110. In some instances, the logging endpoint 160 may determine that the enriched log data should be output to multiple locations. For example, the logging endpoint 160 may determine that the enriched log data should be output both to an end-user-accessible storage location and to a storage location accessible to an administrator of the on-demand code execution system 110. In one embodiment, different versions of the enriched log data (e.g., enriched with different state information) are written to the different locations.

At block 610, the logging endpoint 160 transmits the enriched log data to the determined output location. Such transmission may occur via any number of known transmission protocols, such as HTTP. In one embodiment, transmission of the enriched log data includes authenticating the logging endpoint 160 to the output location. For example, the logging endpoint 160 may utilize pre-determined authentication information (e.g., a password, authentication token, etc.), which may in some instances be specified by a task owner, to authenticate with the output location prior to storing the enriched log data, thus reducing or eliminating a need for that authentication to be handled within code of the task.

In one embodiment, the routine 600 may operate as a continuous loop during operation of the system 110, and thus return to block 602 after implementation of block 610. The routine 600 may thereafter continue as described above. In other embodiments, the routine 600 may end after implementation of block 610. While described above linearly, implementations of routine 600 may implement the above-described functions in different orders or timings. For example, in one embodiment, the logging endpoint 160 may "batch" outputs of enriched log data to an output location, potentially to minimize overhead caused by excessive outputs. Thus, for example, multiple implementations of blocks 602-606 may occur for each implementation of block 608-610. In some instances, the logging endpoint 160 may implement additional functionalities, and thus the routine 600 may include additional or alternative blocks. For example, the logging endpoint 160 may in some embodiments implement functionalities such as log rotation. Thus, the logging endpoint 160 may identify prior log data at an output location to be overwritten by current enriched log data, to ensure that a total space of log data does not exceed a threshold value. The implementation of routine 600 described above is therefore intended to be illustrative in nature.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a non-transitory data store including user-submitted code executable within an isolated execution environment on an on-demand code execution system, wherein the code includes a reference to a logging endpoint;
a computing device providing the isolated execution environment and configured to execute the user-submitted code, wherein execution of the user-submitted code causes the one or more computing devices to generate log data regarding the execution within the isolated execution environment and to transmit the log data to the logging endpoint;
a computing device comprising a processor and implementing the logging endpoint, wherein implementation of the logging endpoint is causes the computing device to:
 receive the log data from the execution of the user-submitted code within the isolated execution environment;
 in response to receiving the log data:
  determine state information regarding a state of the on-demand code execution system at a time of receiving the log data from the execution of the user-submitted code within the isolated execution environment, the state information being inaccessible to the execution of the of the user-submitted code;
  combine the received log data with the state information regarding the state of the on-demand code execution system at the time of receiving the log data to result in enriched log data;
  determine an output location for the enriched log data; and
  store the enriched log data at the determined output location.

2. The system of claim 1, wherein the state information regarding a state of the on-demand code execution system at the time of receiving the log data comprises at least one of a state of a software container representing the isolated execution environment, a state of a virtual machine instance including the isolated execution environment, a state of a physical host computing device including the isolated execution environment, or a state of an auxiliary service in communication with the isolated execution environment.

3. The system of claim 1, wherein the state information includes at least one of a time of generation of the log data, resource usage of the isolated execution environment, computing resources available to the isolated execution environment, a number of executions of user-submitted code occurring within the isolated execution environment, or a number of other execution environments hosted by a physical host computing device hosting the isolated execution environment.

4. The system of claim 3, wherein the time of generation of the log data is inferred based on a time of reception of the log data at the logging endpoint.

5. The system of claim 1, wherein the computing device providing the isolated execution environment and the computing device implementing the logging endpoint are the same computing device.

6. A computer-implemented method comprising:
   executing, within an isolated execution environment of an on-demand code execution system, user-submitted code, wherein the code includes a reference to a logging endpoint, and wherein execution of the user-submitted code causes generation of log data regarding the execution within the isolated execution environment and transmission of the log data to the logging endpoint;
   receiving, at the logging endpoint, the log data regarding the execution of the user-submitted code within the isolated execution environment;
   in response to receiving the log data:
      determining, at the logging endpoint, state information regarding a state of the on-demand code execution system at a time of receiving the log data from the execution of the user-submitted code within the isolated execution environment;
      combining, at the logging endpoint, the received log data with the state information regarding the state of the on-demand code execution system at the time of receiving the log data to result in enriched log data; and
      transmitting, from the logging endpoint, the enriched log data to an output location.

7. The computer-implemented method of claim 6, wherein the reference to the logging endpoint within the user-submitted code includes a uniform resource identifier (URI) associated with a plurality of logging endpoints, and wherein the computer-implemented method further comprises:
   receiving from the execution of the user-submitted code a domain name system (DNS) query requesting resolution of the URI;
   identifying the logging endpoint from the plurality of logging endpoints based on a physical host computing device hosting both the logging endpoint and the execution environment; and
   returning to the execution of the user-submitted code a network address of the logging endpoint.

8. The computer-implemented method of claim 6, wherein at least a portion of the state information is inaccessible to the execution of the user-submitted code.

9. The computer-implemented method of claim 6, wherein the log data is received via a call to an application programming interface (API).

10. The computer-implemented method of claim 9, wherein the API is a hypertext transport protocol (HTTP) API.

11. The computer-implemented method of claim 9, wherein the call to the API specifies a type of state information to be included within the state information.

12. The computer-implemented method of claim 6, wherein a type of state information to be included within the state information is specified as metadata for the user-submitted code.

13. The computer-implemented method of claim 6 further comprising authenticating the logging endpoint to the output location based at least partly on authentication information specified as metadata for the user-submitted code.

14. Non-transitory computer-readable media comprising computer-executable instructions that, when executed on an on-demand code execution system comprising a processor, cause the on-demand code execution system to implement a logging endpoint configured to:
   obtain log data transmitted from an isolated execution environment of the on-demand code execution system during execution of user-submitted code within the execution environment, wherein the user-submitted code includes a reference to a logging endpoint, and wherein execution of the user-submitted code causes generation of the log data regarding the execution within the isolated execution environment and transmission of the log data to the logging endpoint;
   in response to receiving the log data:
      determine state information regarding a state of the on-demand code execution system at a time of receiving the log data from the execution of the user-submitted code within the isolated execution environment;
      combine the received log data with the state information regarding the state of the on-demand code execution system at the time of receiving the log data to result in enriched log data; and
      transmit the enriched log data to an output location.

15. The non-transitory computer-readable media of claim 14, wherein the isolated execution environment includes at least one of a software container, a virtual machine instance, or a physical computing device.

16. The non-transitory computer-readable media of claim 14, wherein the user-submitted code is first user-submitted code, and wherein the output location is an execution of second user-submitted code on the on-demand code execution system.

17. The non-transitory computer-readable media of claim 16, wherein the execution of second user-submitted code on the on-demand code execution system is configured to format the enriched log data for storage at a network-accessible storage service and store the enriched log data at the network-accessible storage service.

18. The non-transitory computer-readable media of claim 17, wherein the execution of second user-submitted code on the on-demand code execution system is further configured to authenticate the second user-submitted code with the network-accessible storage service on behalf of the first user-submitted code.

19. The non-transitory computer-readable media of claim 14, wherein the logging endpoint is further configured to:
   obtain second log data transmitted from the execution environment of the on-demand code execution system during execution of the user-submitted code;
   determine second state information regarding the state of the on-demand code execution system during the execution of the user-submitted code; and
   enrich the second log data with the second state information to result in second enriched log data; and
   wherein transmission of the enriched log data to the output location further includes transmission of the second enriched log data.

20. The non-transitory computer-readable media of claim 14, wherein transmission of the enriched log data to the output location occurs subsequent to halting of the execution of the user-submitted code.

* * * * *

UNITED STATES PATENT AND TRADEMARK OFFICE
CERTIFICATE OF CORRECTION

PATENT NO. : 10,776,091 B1
APPLICATION NO. : 15/905342
DATED : September 15, 2020
INVENTOR(S) : Timothy Allen Wagner Page 1 of 1

It is certified that error appears in the above-identified patent and that said Letters Patent is hereby corrected as shown below:

On the Title Page

On Page 3, Column 2, Item (56), Line 29, under U.S. Patent Documents, delete "DHaan" and insert --DeHaan--.

On Page 6, Column 1, Item (56), Line 6, under Other Publications, delete "064071dated" and insert --064071 dated--.

In the Claims

In Column 34, Line 40, Claim 1, delete "of the of the" and insert --of the--.

Signed and Sealed this
Eighth Day of December, 2020

Andrei Iancu
*Director of the United States Patent and Trademark Office*